(12) United States Patent
Steinborn

(10) Patent No.: US 6,915,632 B2
(45) Date of Patent: Jul. 12, 2005

(54) ACTUATOR FOR A VALVE, IN PARTICULAR A TURBINE VALVE

(75) Inventor: Richard Steinborn, Leverkusen (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 10/399,717

(22) PCT Filed: Oct. 11, 2001

(86) PCT No.: PCT/EP01/11799

§ 371 (c)(1),
(2), (4) Date: Apr. 21, 2003

(87) PCT Pub. No.: WO02/35123

PCT Pub. Date: May 2, 2002

(65) Prior Publication Data

US 2004/0021104 A1 Feb. 5, 2004

(30) Foreign Application Priority Data

Oct. 20, 2000 (EP) .............................. 00122837
Aug. 10, 2001 (EP) .............................. 01119339

(51) Int. Cl.[7] .............................................. F16K 31/06
(52) U.S. Cl. .......................................... 60/413; 251/67
(58) Field of Search ...................... 251/67, 68; 60/325, 60/413

(56) References Cited

U.S. PATENT DOCUMENTS 2,387,792 A * 10/1945 Holmes ........................ 251/67
3,017,157 A   1/1962 Parsons et al.
3,778,027 A * 12/1973 Collins et al. ............... 251/297
3,987,818 A * 10/1976 Williams ................. 137/630.13
4,239,186 A * 12/1980 Pratap ......................... 251/255
5,172,719 A * 12/1992 Dawawala et al. ..... 137/315.01

FOREIGN PATENT DOCUMENTS

| DE | 1 937 198 | 2/1971 |
| DE | 44 46 605 A1 | 6/1996 |
| DE | 298 01 229 | 5/1998 |
| EP | 0 040 732 | 12/1981 |
| EP | 0 145 828 | 6/1985 |
| EP | 0 230 849 A1 | 8/1987 |
| WO | WO 9531661 A1 * | 11/1995 ........... F16K/31/04 |
| WO | WO 98/13633 | 4/1998 |

* cited by examiner

Primary Examiner—Thomas E. Lazo
(74) Attorney, Agent, or Firm—Staas & Halsey LLP

(57) ABSTRACT

An actuator includes a valve spindle, for adjustment of an opening position for a valve and a drive piece for the valve spindle. The drive piece is connected to the valve spindle, by a storage device, which may be pre-tensioned to a particular pre-tensioned value during a pre-tension process, in such a manner that, with a pre-tensioned storage device the opening position can be set without altering the value of the pre-tensioning. The actuator is particularly suitable for a valve on a steam turbine or a gas turbine. As an example, the actuator may be a hydraulic damping unit, integrated in a damping piston. The damping unit permits a reliable end-travel damping for the valve, in particular in the case of rapid closure.

19 Claims, 7 Drawing Sheets

ACTUATOR FOR A VALVE, IN PARTICULAR A TURBINE VALVE

CROSS REFERENCE TO RELATED APPLICATIONS

This application is based on and hereby claims priority to German Application Nos. 00122837.8 filed on Oct. 20, 2000 and 01119339.8 filed on Aug. 10, 2001, the contents of which are hereby incorporated by reference.

BACKGROUND OF THE INVENTION

1. Field of the Invention

The invention relates to an actuator for a valve, in particular a turbine valve, with a valve spindle for setting an opening position of the valve and with a drive part assigned to the valve spindle.

2. Description of the Related Art

A turbine, in particular a steam turbine, normally has a considerable number of valves which may be used, for example, as fresh-steam, interception or diversion valves and as quick-action stop valves. The opening position of each of these valves serves in this case for setting a respective material, gas or steam stream and can be set, for example, via a valve spindle assigned to the respective valve. Such a valve spindle is an integral part of an actuator assigned to the valve. The actuator may in this case have to satisfy very high requirements, particularly in terms of actuating force and actuating speed. For a high reliability of the valve, it may be necessary, for example, for the actuator to have an actuating force of about 200 kN and an actuating time of about 100 ms, particularly when there is a quick-action stop requirement.

The valves are therefore conventionally designed as oil-hydraulically operated actuating valves, the actuators assigned to them including in each case an oil-hydraulic device. For operating the actuators and therefore the valves, for example, a central hydraulic supply system may be provided. For a central hydraulic supply system of this type, however, it is necessary to have a complex and therefore cost-extensive pipeline system which should also be designed redundantly for high operating reliability. To simplify a complex supply system of this type, European patent application EP 0 040 732 A1 and the paper by W. Kindermann, E. G. Egener and H. Tremühlen, "Compact Valve Actuator Control System for Large Steam Turbines", presented at the American Power Conference, Chicago, 1984, disclose actuators for steam turbine valves which in each case have a decentralized hydraulic system. The hydraulic system of an actuator of this type is integrated into a compact drive block arranged on a valve housing, so that only a cable system is still necessary in order to supply energy to the actuator. By oil being used as hydraulic fluid, an ignition of the oil and therefore a fire in the steam turbine could occur under extremely unfavorable circumstances. Admittedly, with a view to fire protection, low-combustible fluids may also be used as hydraulic fluid. However, low-combustible hydraulic fluids of this type are costly and, because of their lower stability, as compared with hydraulic fluids based on mineral oils, require comparatively complicated care measures.

DE-A-1 937 198 describes a regulating valve for regulating the pressure and/or the quantity of a flowing medium in power stations, chemical plants or the like. The regulating valve has a push rod, to which a valve seat is fastened. The push rod is coupled to an electric servo-motor via a beam rotatable about a central center of rotation. The quantity of medium flowing through the valve can thereby be set. Furthermore, a return spring engages on the push rod.

EP 0 230 849 A1 specifies a regulating valve and a shut-off valve. The valve has a shut-off body which is displaceable along an axis and which has a piston extending along the axis. The piston is designed as a spur-toothed rack which is in contact with a longitudinal toothing of a further bar. As a result of a rotation of this further bar about its bar axis, a displacement of the shut-off body in the axial direction can be achieved. A rotation of this bar takes place by a further toothing at the end of this bar via an electric motor.

DE 44 46 605 A1 discloses a valve for a steam turbine which has a valve spindle with a valve cone arranged on it. The valve spindle is driven via an electric motor which is connected to the valve spindle via an electromagnetically actuated coupling. For automatic self-closing of the valve, the latter includes a cup-spring system. The electromagnetic coupling is connected to a threaded bush which cooperates with a valve spindle guided fixedly in terms of rotation and which thus moves the latter axially. The threaded bush is designed as a ball-screw bush, so that it acts upon the valve spindle with low play and low friction. Since the valve spindle is guided fixedly in terms of rotation, that is to say it can only be moved up and down axially when the threaded bush rotates, it is not necessary to have a drive which has the effect of translational motion. Instead, an electric motor rotating in two directions is sufficient for this purpose. However, the electric motor must have a torque safeguard, in order thereby to ensure that, for example during the closing of the valve, the valve cone adjoining the valve spindle at one end is not damaged or does not damage the sealing seat (valve seat) assigned to the valve cone when the latter comes to bear on the sealing seat.

WO 98/13633 specifies an actuator for a valve for a turbine, the opening position of which valve can be set by a push rod, a fault-free operation of the valve being ensured, along with a particularly low fire risk. For this purpose, an electric motor is provided for driving the push rod. The push rod is connected to the electric motor via a gearwheel/rack system and via an electromagnetic toothed coupling. For reasons of operating reliability for the actuator and therefore also for the valve capable of being driven by the latter, in WO 98/13633 a retaining-spring system is also arranged on the push rod. The system includes a retaining spring which is arranged in a housing and which acts on a thrust plate fastened to the push rod. The actuator is in this case designed in such a way that the spring force of the retaining spring causes a closing of the valve. In this case, for opening the valve, the electric motor acts counter to the spring force of the retaining spring.

An electromechanical actuator for a valve, in particular for a steam turbine valve, is specified in WO 99/49250. The actuator has a push rod and an electric motor for driving the push rod. The push rod and the electric motor are connected via a transmission device, by which a changing torque can be generated, depending on the axial displacement of the push rod. The push rod is connected to a return-spring system. In this case, even in the closing position of the valve, the push rod is loaded by the return force of the return-spring system which is designed as a valve cup spring accumulator assembly. During an opening movement of the actuator, the return-spring system is further tensioned and reaches its maximum return force when the valve is in the open position. Consequently, in a similar way to what is described in WO 98/13633, during the setting of an opening position of the valve, the drive has to perform work counter to the considerable return force of the return-spring system.

SUMMARY OF THE INVENTION

An object on which the invention is based is, therefore, to specify an improved actuator for a valve, in particular for a turbine valve, in which, along with a particularly low fire risk, a fault-free and reliable operation of the valve is ensured and the setting of an opening position of the valve is possible with little effort.

This object is achieved, according to the invention, by an actuator for a valve, in particular a turbine valve, with a valve spindle for setting an opening position of the valve and with a drive part assigned to the valve spindle, the drive part being coupled to the valve spindle via an accumulator device pretensionable to a pretension in a tensioning operation, in such a way that, with the accumulator device pretensioned, the pretension remains unchanged during the setting of the opening position.

The invention is based on the knowledge that, in conventional actuators which are equipped with a safety quick-action stop system, the setting of an opening position of a valve by an actuator coupled to the valve is possible only with considerable effort. This is because work has to be performed with respect to the return force of a spring, for example a valve cup spring accumulator assembly. During an opening movement of the actuator, the spring is tensioned and reaches its maximum return force when the valve is in the opening position. This requires a corresponding heavy-duty design of the drive part driving the valve spindle. Owing to this type of rigid coupling of the setting operation and the operation of tensioning the spring for the quick-action stop system, in the event of a regular change or setting of the opening position of the valve a generally very high changing force always has to be applied to the valve spindle. The necessary setting force in this case increases continuously, for example, during opening and decreases continuously, according to the spring characteristic, during closing. In addition, when an opening position is held, for example with the valve fully open, the (maximum) return force has to be maintained by additional measures. The drive parts of valves of this type and the coupling, gear and motor components connected to a drive part have a correspondingly complex design.

By contrast, the actuator of the invention opens up a completely new way of making it possible to set an opening position of a valve assigned to the actuator, while at the same time having high operating reliability. Proceeding from the above-described disadvantages in the known embodiments, the fundamental idea of the proposed actuator lies in a separation and therefore uncoupling of the operation of setting an opening position from the operation of tensioning the accumulator device. The drive part is coupled to the valve spindle via an accumulator device pretensionable to a pretension in a tensioning operation, in such a way that, with the accumulator device pretensioned, the pretension remains unchanged during the setting of the opening position. The pretensioning of the accumulator device and the setting of the opening position of the valve are therefore conceived as independent operations which do not influence one another. Thus, for example, with the valve fully closed, the accumulator device can be pretensioned to a pretension, and, the thereafter, an opening position of the valve can be executed by the drive part assigned to the valve spindle, without any further action on the accumulator state of the accumulator device.

Advantageously, as a result, the effort for setting an opening position can be reduced considerably. In particular, during a setting operation, the setting force is essentially constant due to the uncoupling from the tensioning operation. The drive part and further drive components, for example a gear and/or a motor, assigned, if appropriate, to the drive part can be designed specially with a view to the requirements during the setting operation. To be precise, by virtue of the uncoupling of the tensioning operation and the setting operation, a controlled adaptation and design of the drive part and, if appropriate, of further drive components according to the respective operation can advantageously be achieved for the first time. This may be implemented, for example, by a two-stage design of the drive part with a power stage for the tensioning operation and with a now generally substantially lower power stage for the setting operation.

In this case, in a preferred embodiment of the invention, during the setting of the opening position, the actuating force to be applied for this purpose is lower than the pretension. The effort involved in a setting operation is thereby reduced considerably, with the result that the mechanical load on the components, for example valve spindle or drive part, which move during a setting operation is correspondingly reduced. The wear of these components and of the components coupled, if appropriate, to them is thereby likewise markedly lower, with a result that the useful life of the actuator and a valve connected to the actuator is increased correspondingly. Advantageously, due to the reduced effort involved in setting an opening position, a correspondingly larger number of setting operations, as compared with the known embodiments of an actuator, can be achieved.

In a further preferred embodiment, the drive part is connected under pretension to the accumulator device in such a way that the drive part is moved jointly with the accumulator device during the setting of the opening position. By virtue of this embodiment, advantageously, the accumulator device is moved jointly with the drive part. Since the drive part drives the valve spindle during the setting of the opening position, the movement of the valve spindle is thus also synchronized with the movement of the accumulator device. Advantageously, this results in a comprehensive availability of the accumulator device, particularly of the pretension stored in the accumulator device, in all the phases of a setting operation. Thus, in the event of a necessary quick-action closure of the valve, the pretension stored in the accumulator device is available at any time and immediately for the quick-action closure. Due to the synchronization of the movement during the setting of an opening position, the accumulator device as a whole is moved, the pretension remaining unchanged.

Preferably, to maintain the pretension, a latching element which latches during the tensioning operation is provided. During a tensioning operation, the accumulator device is pretensioned to a pretension. In this case, a corresponding potential energy is stored in the accumulator device. The latching element ensures that the stored energy is maintained and is available at any time, for example, for a quick-action closure. In this case, if necessary, the latching element can be released in a short time and therefore the potential energy stored in the accumulator device can be freed and used for a quick-action closure. The main task of the latching element is, however, to preserve the energy stored in the accumulator device for a long period of time, so that reliable operation during the setting of the opening position is ensured. Advantageously, moreover, the energy content in the accumulator device can be predetermined by the exact configuration and arrangement of the latching element. In this case, with an appropriately predeterminable pretension, a latching position of the latching element can be determined and, in structural terms, provided for the tensioning operation.

Preferably, the latched latching element holds at least about 50% of the pretension. Advantageously, in this case, the latching element holds as large a fraction of the pretension of the accumulator device as possible. Preferably, the latching element holds the entire pretension of the accumulator device, so that the entire stored potential energy in the accumulator device, at the same time as being held by the latching element, is also secured. The exact selection of the fraction of the pretension held by the accumulator device can in this case be adapted to the respective structural conditions and to the quick-action closure requirements relevant for use.

In a particularly preferred embodiment, a release device is provided, which holds approximately up to 50% of the pretension. By a release device being provided, in combination with the latching element, a particularly effective storage and release of the pretension energy stored in the accumulator device is achieved. In this case, advantageously, the essential fraction of the pretension is held by the latching element, while the release device holds a correspondingly smaller fraction of the pretension.

Advantageously, via the release device, the potential energy stored in the accumulator device can be released, for example, as a function of a release criterion. The release device may in this case be designed as part of the latching element or else be conceived independently of this. Advantageously, therefore, for example, a quick-action closure of a valve connected to the actuator can be triggered by the release device. In this case, the release device releases that fraction of stored pretension which is held by it, and the released energy can be used for triggering an operation for the detensioning of the entire accumulator device. Consequently, for example, the latching element can be released, the latching element being released from its latching position. This may advantageously take place solely by virtue of the controlled proportionate distribution of the pretension to be held to the latching element and to the release device, in that, for example, the latching element is designed with a view to a predeterminable maximum tolerable pretension. When this maximum value is exceeded, the latching element is released and the pretension stored in the accumulator device is released essentially completely within a short time.

Advantageously, owing to the proportionate distribution of the pretension which is to be held by the latching element and the release device, a particularly flexible adaptation to the respective structural configuration of the latching element and of the release device is possible. In general, in this case, the latching element will hold the essential fraction of the pretension and the release device only a smaller fraction in order to trigger a release. It is a particular advantage in this case, that, by a skillful distribution of the fractions to the latching elements and the release device, a release criterion can be set in a flexible way:

Preferably, the release device can be activated electromagnetically, in particular by a coil. In this case, with a change in an electromagnetic flux, the release device releases the pretension in the accumulator device. A change in an electromagnetic flux may in this case signify a connection or alternatively also a disconnection of an electromagnetic field. This can be implemented, in particular, by a coil which, with the release device closed, that is to say with the pretension of the accumulator device being held, can be operated with current load or alternately also currentlessly. The release device can be activated in different ways, as required, by a corresponding change in an electromagnetic flux.

In a particularly preferred embodiment, the latching element has a pliable, in particular resiliently elastic, tongue for positive engagement with a latching ramp. During the tensioning operation, the tongue of the latching element comes into contact with the latching ramp, the tongue being moved in relation to the latching ramp. Owing to the pliable, in particular resiliently elastic, design of the tongue, particularly effective contact can be made between the tongue and the latching ramp, a force being applied. For this purpose, the latching ramp may have a contact surface which forms, for example, an inclined plane in relation to the tongue of the latching element. Thus, during a tensioning operation, the tongue slides upward along the inclined plane and, after the end of the tensioning operation, latches into a latching position, a positive connection being made between the latching ramp and the pliable tongue. In this case, advantageously, the latching ramp may be designed as part of the drive part, during a tensioning operation, the drive part which has the latching ramp being moved with respect to the latching element which has the tongue. After the tensioning operation, positive engagement is achieved, the latching element dwelling, together with the tongue, in the latching position, the accumulator device of the actuator being acted upon by corresponding pretension. The pliable tongue may in this case be formed of an elastic material, for example of a metal. During the setting of the opening position of the valve after a tensioning operation, the pretension of the accumulator device remains unchanged.

Preferably, a plurality of tongues are provided, which bracket the latching ramp in a circumferential direction. A multiple securing of the latching element by a corresponding multiplicity of tongues can thereby be achieved. Furthermore, the bracketing in a circumferential direction ensures a uniform latching and holding of the pretension, while advantageously, during the tensioning operation, circumferential guidance is achieved during the relative movement between the tongues and the latching ramp, in a similar way, for example, to a bush which guides a shaft. A tensioning operation can thus be achieved reproducibly and uniformly, while avoiding mechanical stress peaks in an individual tongue or in a region of the contact surface between a tongue and the latching ramp. The plurality of tongues is in this case advantageously arranged essentially concentrically around a drive part having a latching ramp. By an additionally symmetric arrangement of the tongues, a particularly uniform load absorption and load distribution are ensured during a tensioning operation, in particular during the positive latching or engagement of the tongues with the latching ramp. Moreover, by virtue of this symmetric arrangement of the tongues, a particularly uniform pretensioning of the accumulator device can be achieved, high reliability being afforded by this type of guidance.

In a further preferred embodiment, a bracket basket partially formed by the tongues is provided, the bracket basket bracketing the drive part. In the case of a plurality of tongues which are each designed, for example, as a pliable, in particular resiliently elastic, metal strip or metal lamellae, these form the open end of the bracket basket or lamellar basket. The bracket basket brackets the drive part, while, as a result of the pliably elastic properties of the tongues, a bracket force acting over the full circumference perpendicularly to the contact surface between the bracket basket and the drive part is exerted on the drive part.

As a result of this bracket action, the bracket basket or lamellar basket is connected to the drive part in a particularly advantageous way. Insofar as the drive part has at the same time a latching ramp, a bracket force also acts during a tensioning operation and, in particular, in the latching position. During a tensioning operation, the bracket basket partially formed by the tongues is moved in relation to the latching ramp, particularly in relation to the drive part, at the same time a pretension being applied to the accumulator device.

The bracket basket or lamellar basket in this case preferably may be formed of an elastic material, for example a metal sheet, which is appropriately machined (for example, punched) and shaped in order to produce the tongues or lamellae.

Preferably, a spring element, in particular a cup spring, storing the pretension is arranged in the bracket basket. A system formed of cup springs, for example what is known as a cup spring assembly, may also be provided in the bracket basket or lamellar basket. By a spring element being arranged in the bracket basket, the spring element is enclosed by the bracket basket both during a tensioning operation and during the setting of an opening position of the valve. Thus, after a tensioning operation, the pretension stored in the spring element is as it were also enclosed. The enclosure or bracketing can be changed in such a way that, in the event of a release, for example by the above-described release device, the enclosed pretension, that is to say the spring force stored in the spring element, loosens or else releases the bracketing, and the spring element can thereby expand within a short time. The released spring energy is in this case used conventionally for an operation for the quick-action closure of a valve connected to the actuator. In this case, the valve spindle is brought in a short time from an opening position into the closing position by the expanding spring element. Before a (regular) setting of an open position of the valve is carried out, the spring element is to be pretensioned anew, for example for reasons of operating reliability, the valve preferably dwelling in its closing position. After the tensioning operation, a setting of an opening positon of the valve by the pretension spring element enclosed in the bracket basket can take place without any change in the pretension of the spring element. In particular, there is no need for any effort with respect to the return force of the spring element, in order to achieve the desired opening position of the valve spindle, since the tensioning operation is uncoupled from the setting operation, that is to say from the setting of an opening position.

Preferably, the bottom of the bracket basket has a damper piston which is provided for damping the movement of the valve spindle, in particular during an expansion of the spring element. By the damper piston, end-position damping, for example during a quick-action closure of the valve, that is to say during an acceleration of the valve spindle from an opening position into the closing position, is achieved, but, for example, also whenever an end position is reached after the setting of an opening position.

Advantageously, in this case, the damper piston is an integral part of the bracket basket or lamellar basket, so that the bracket basket thereby performs a double function, to be precise the reception of the pretensioned spring element and the property of ensuring the desired end-position damping in the event of a quick-action closure. The damper piston may in this case be capable of being pushed in and consequently of being guided in a damping cylinder which is assigned to the damper piston and which may also be designated as the main damping cylinder, the damping cylinder being additionally acted upon, for damping, by a damping fluid or hydraulic fluid, for example oil.

Further particularly preferred embodiments of a markedly improved damping can be achieved by the measures described in detail below:

In a particularly preferred embodiment, the hydraulic damping device for end-position damping is integrated to the damper piston.

In the present design of the actuator with a drive part which is coupled to the valve spindle via an accumulator device pretensionable to a pretension in a tensioning operation, for example via an electromechanical coupling, a virtually rigid connection or coupling is afforded between the drive part and the valve spindle and a valve cone or closing piece adjoining the latter. If the drive part is separated from the valve spindle in the event of quick-action closure triggering, the energy, now acting freely, of the accumulator device, for example a pretensioned cup spring system, accelerates the valve spindle together with the following valve cone in the closing direction. In this case, closing speeds of typically 4 m/s or above are customary. In the range of opening of about 10 to 20%, it is therefore beneficial to provide hydraulic damping which reduces the closing speed to, for example, 0.5 m/s, so that an impact of the valve spindle or of the following valve cone into the valve seat, with possible accompanying damage, can be largely ruled out. The integrated hydraulic damping device proves to be particularly advantageous in this case for end-position damping. This end-position damping, at the moment when the valve spindle with a valve cone is set down into the valve seat, cancels the rigid coupling between valve spindle and spring element, and the kinetic energy is reduced considerably. In this case, by virtue of the integrated design, a particularly compact construction is additionally implemented. In cooperation with a damping cylinder, the damper piston, together with the integrated hydraulic damping device, allows a particularly reliable and durable operation of the actuator precisely in quick-action closure situations.

In a particularly preferred embodiment, the hydraulic damping device includes a first sealing space and a second sealing space different from the first sealing space, in this case hydraulic fluid, for example oil, for damping being capable of being supplied to or of being discharged from the sealing spaces of a function of the opening position.

In this case, preferably, the supply or discharge of a hydraulic fluid in the first sealing space and in the second sealing space is brought about in each case via a differential pressure induced as a result of a change in volume of the sealing spaces. Thus, an integrated damping device controlled by differential pressure is provided, which, depending on the opening position, ensures particularly adapted damping. Depending on whether the pressure in a sealing space is higher or lower than the ambient pressure, such as corresponds, for example, to the pressure of the hydraulic fluid which is located in an interspace formed by the damper piston together with a damping device and a damping cylinder surrounding the damper piston, a positive or negative differential pressure will be obtained with respect to the sealing space under consideration. As a result, hydraulic fluid is correspondingly supplied to the sealing space or discharged, in particular pressed, out of the sealing space.

To use a change in volume of sealing space in order to build up the differential pressure proves in this case to be particularly advantageous, because a change in volume can be achieved during an actuating operation in a relatively simple way as a function of the respective opening position of the actuator.

For the spatial separation of the first sealing space from the second sealing space, a movable actuator plate is preferably provided. The sealing spaces are thereby separated spatially from one another, for example the first sealing space being arranged in the direction of the closing position and the second sealing space in the direction of the opening position of the actuator. The movable actuator plate advantageously at the same time assumes a further function, in that it effects a change in volume of a sealing space. For this purpose, the actuator plate may be indirectly or directly connected to the valve spindle or coupled to the latter.

In a preferred embodiment, a hydraulic throttle element is adjacent to at least one of the sealing spaces. An outflow of hydraulic fluid from the respective sealing space is thus possible advantageously only or essentially only via this throttle element. In this case, the time profile of the outflow of hydraulic fluid, for example of oil, can be predetermined via the cross section of the throttle element. The oil flowing out of the throttle can be received in a largely pressureless collecting space formed, for example, within the housing of the actuator.

In a further preferred embodiment, one sealing space has arranged in it a deformable sealing element, via the deformation of which the volume of the sealing space can be changed. Depending on the actuating operation and actuating situation, particularly as a function of the direction of movement of the valve spindle, the deformable sealing element is deformed and in the process, for example, compressed or stretched.

Consequently, the sealing surface assigned to the sealing element is correspondingly increased or reduced. This change in the effective sealing surface via a deformation of the sealing element has a direct effect on a change in volume of the sealing space under consideration. The sealing space is correspondingly reduced or increased. What can thus be achieved, in cooperation with the movable actuator plate, is that the other sealing space in each case behaves in the opposite way to the sealing space under consideration and either increases its volume correspondingly, that is to say, as a result, the sealing space is filled with hydraulic fluid owing to the vacuum which builds up, or else the volume is correspondingly reduced, this being accompanied by a discharge of oil from the sealing space. In this advantageous embodiment, a respective sealing element is provided, for example, on both sides of the actuator plate, a first deformable sealing element being assigned to the first sealing space and a second deformable sealing element being assigned to the second sealing space.

Preferably, a setting element, in particular a setscrew, is provided, which acts directly or indirectly on the sealing element and serves for setting the elasticity of the sealing element. The setting element may in this case, for example, pretension the deformable sealing element, thus changing the elastic properties of the sealing element. The achievable change in volume in the sealing spaces and the differential pressure brought about thereby can consequently be set, thus correspondingly influencing the damping properties of the integrated hydraulic damping device.

Advantageously, the actuator is characterized by a design for a valve of a steam turbine. Further applications of the actuator for valves in other turbomachines, for example in a gas turbine, are likewise possible. In view of the requirements placed on a valve to be designed to be acted upon by fresh steam under high pressure of up to 300 bar and high temperatures of up to 650° C. and on a corresponding actuator, the actuator according to the present invention appears to be particularly suitable for use in a steam turbine valve, in particular for the feed of fresh steam.

However, the fundamental idea of the concept according to the invention can also readily be applied to actuators for valves in other technical sectors, for example as a fitting in plants of the chemical industry or in pipelines carrying a hot pressure-loaded fluid.

BRIEF DESCRIPTION OF THE DRAWINGS

These and other objects and advantages of the present invention will become more apparent and more readily appreciated from the following description of an exemplary embodiment, taken in conjunction with the accompanying drawings which are partially diagrammatic and not true to scale and, for the sake of clarity and for understanding, cover only the components of an actuator which are important for the explanation. In the drawing.

DETAILED DESCRIPTION OF THE PREFERRED EMBODIMENTS

Reference will now be made in detail to the preferred embodiments of the present invention, examples of which are illustrated in the accompanying drawings, wherein like reference symbols refer to like elements throughout.

Figure 1:
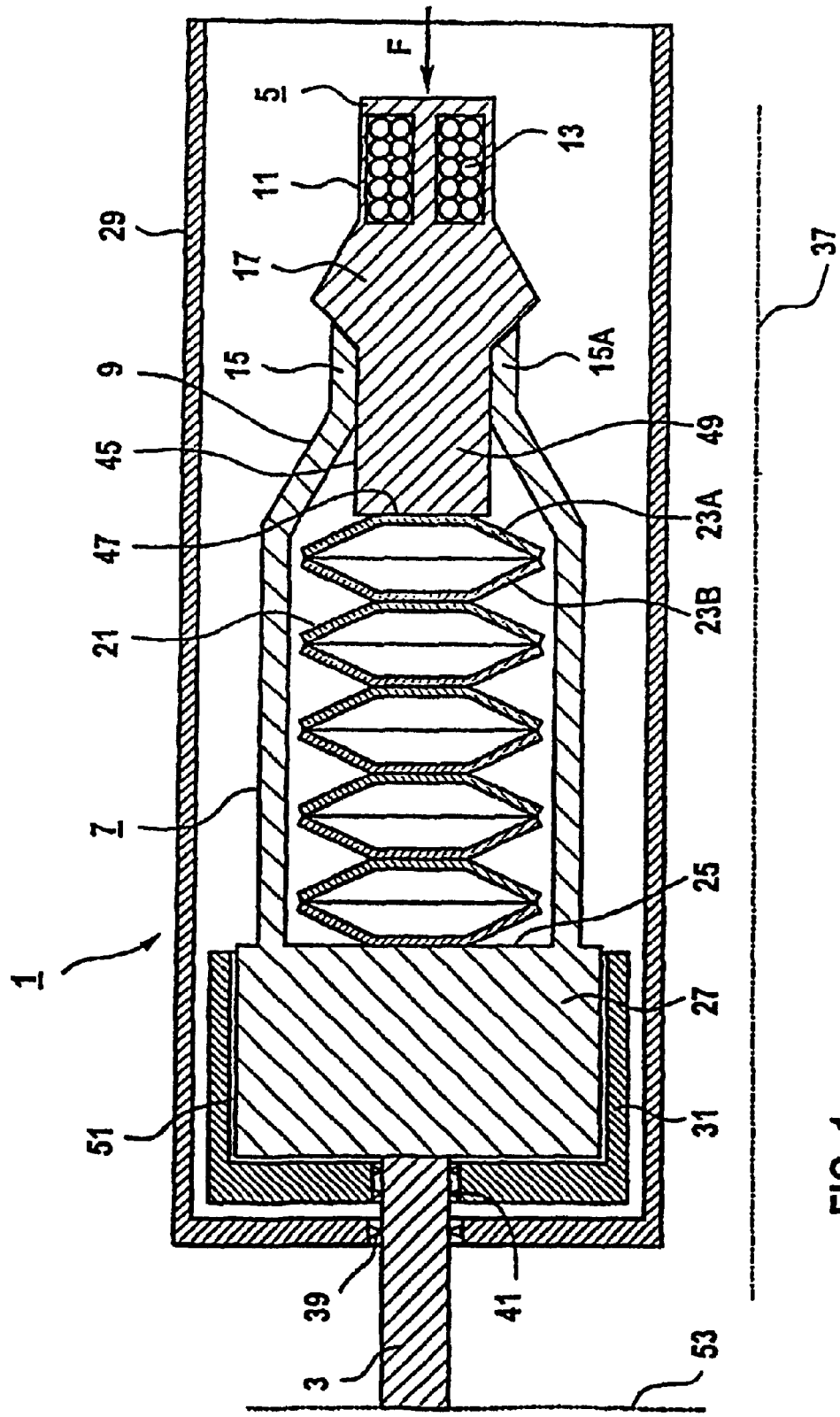
FIGS. 1 to 4 show in each case a longitudinal section through a diagrammatically illustrated actuator in various actuating states.

FIG. 1 shows, in longitudinal section, an actuator 1 for a valve, in particular a turbine valve. The actuator extends along a longitudinal axis 37 and has, successively along the axis 37, a valve spindle 3 for setting an opening position of a valve, not illustrated in any more detail in FIG. 1, an accumulator device 7 and a drive part 5. The drive part 5, the accumulator device 7 and the valve spindle 3 are in this case arranged at least partially in a housing 29. The accumulator device 7 has a spring element 21, the spring element 21 being composed of a multiplicity of cup springs 23A, 23B arranged along the longitudinal axis 37 and adjacent to one another. The drive part 5 is coupled to the valve spindle 3 via the accumulator device 7. The coupling of the accumulator device 7 to the valve spindle 3 is achieved via a damper piston 27 formed at the bottom 25 of the accumulator device 7. For this purpose, the valve spindle 3 is connected to the damper piston 27. The damper piston 27 limits the accumulator device 7 in an axial direction along the longitudinal axis 37. At that end of the accumulator device 7 which is located opposite the damper piston 27 along the longitudinal axis 37, the accumulator device 7 has a latching element 9. The latching element 9 has a tongue 15 which extends in a direction parallel to the longitudinal axis 37. The tongue 15 in this case may be formed of a pliable, in particular resiliently elastic material, for example a metal. The drive part 5 of the actuator 1 is contiguous to the latching element 9 of the accumulator device 7 along the longitudinal axis 37. The coupling of the accumulator device 7 to the drive part 5 takes place by contact of the tongue 15 with an outer surface 45 of the drive part 5. Further coupling of the drive part 5 to the accumulator device 7 takes place by contact via a thrust surface 47 of the spring element 21. The thrust surface 47 is in this case in contact with the outer surface 45 of a ram 49 of the drive part 5, the ram extending along the longitudinal axis 37. Thus, as required, for example during a tensioning operation, a force F can be exerted on the spring element 21 in the direction of the longitudinal axis 37 via the thrust surface 47. The drive part 5 has a latching ramp 17 which is formed on the outer surface 45 over the circumference of the drive part 5. In this case, the latching element 9 of the latching ramp 17 are contiguous to one another, the latching element 9 following the latching ramp 17 in the direction of force, as seen in the direction of the force F to be applied. The latching element 9 bears with the tongue 15 on the outer surface 45 of the latching ramp 17, a positive connection being achieved. The drive part 5 has, further, a release device 11 which includes a coil 13. The coil 13, in this case, can be acted upon by an electrical current and is integrated into the drive part 5. Nonintegrated embodiments, with a release device 11 arranged separately from the drive part 5, are likewise possible.

A damping cylinder 31 is adjacent to the damper piston 27 along the longitudinal axis 37, the damping cylinder 31 surrounding the damper piston 27 so as to form a gap 51. The damper piston 27 is in an abutment or end position along the longitudinal axis 37 with respect to the direction of a force F to be applied. The valve spindle 3 connected to the damper piston 27 is consequently in a closing position 53, a closing piece (valve cone), not shown in FIG. 1, connected to the valve spindle 3 being seated sealingly in a valve seat of a valve, likewise not illustrated in FIG. 1, connected to the actuator 1. As a result of the closing position 53 of the valve spindle 3, a fluid fed to a turbine with the aid of a valve assigned to the valve spindle 3 is interrupted in its flow. Consequently, with the valve closed, no fluid, for example hot steam for a steam turbine, is fed. In the actuating state of the actuator 1, as shown in FIG. 1, the spring element 21 is largely expanded. This actuating state, with the valve closed and the accumulator device 7 expanded, may occur, for example, after a quick-action closure of the actuator 1 and of the associated valve has taken place.

After a quick-action closure has taken place, in order to set an opening position of the valve, first the accumulator device 7 is to be pretensioned with a predeterminable pretension. The operation of tension in the accumulator device 7 is illustrated in more detail in FIG. 2 which shows the actuator 1 of FIG. 1 in an actuating state during an operation for tensioning the accumulator device 7. In a tensioning operation, a pretension is applied to the spring element 21 of the accumulator device 7, in that a force F, provided via the drive part 5, is exerted on the thrust surface 47 of the spring element 21. The spring element 21 or the cup springs 23A, 23B forming the spring element 21 are thereby compressed. At the same time, the ram 49 is moved parallel to the longitudinal axis 37 in the direction of the force F. An elastic bending apart or opening of the tongue 15 of the latching element 9 is associated with this deflection of the drive part 5 with respect to the stationary accumulator device 7, the tongue 15 remaining in contact with the latching ramp 17 during this relative movement and following essentially the contour of the latching ramp 17 during the linear movement. The latching ramp 17 has a contour with a rising flank 33 and with a falling flank 35 adjoining the rising flank 33 along the longitudinal axis 37. The surface 45 forms, along the rising flank 33 and the falling flank 35, a reaction surface for the latching element 9, in particular for the pliable, resiliently elastic tongue 15. In addition to a tongue 15, the latching element 9 may also have a further tongue 15A, both the tongue 15 and the further tongue 15A sliding along the latching ramp 17 during the tensioning operation, at the same time being spread apart in a plane perpendicular to the longitudinal axis 37. When a force F growing according to the spring characteristic of the spring element 21 is exerted further, the tensioning operation is continued until the tongue 15, 15A, gradually closing together again, slides along the falling flank 35 of the latching ramp 17 and finally the latching element 9 latches into place the latter reaching its latching position. When the latching position is ultimately reached (see also FIG. 3), the tensioning operation is concluded and the accumulator device 7 is pretensioned to a pretension Fv. At the same time, the actuator 1 is brought into an actuating state which represents operational readiness for setting an opening position D of a valve connected to the actuator 1 (operating position). In the latching position, the latching element 9, together with the pliable, resiliently elastic tongue 15, 15A, is in positive engagement with the latching ramp 17. The latching element 9 is thus latched, the tongue 15, 15A fitting snugly against the release device 11.

Figure 3:
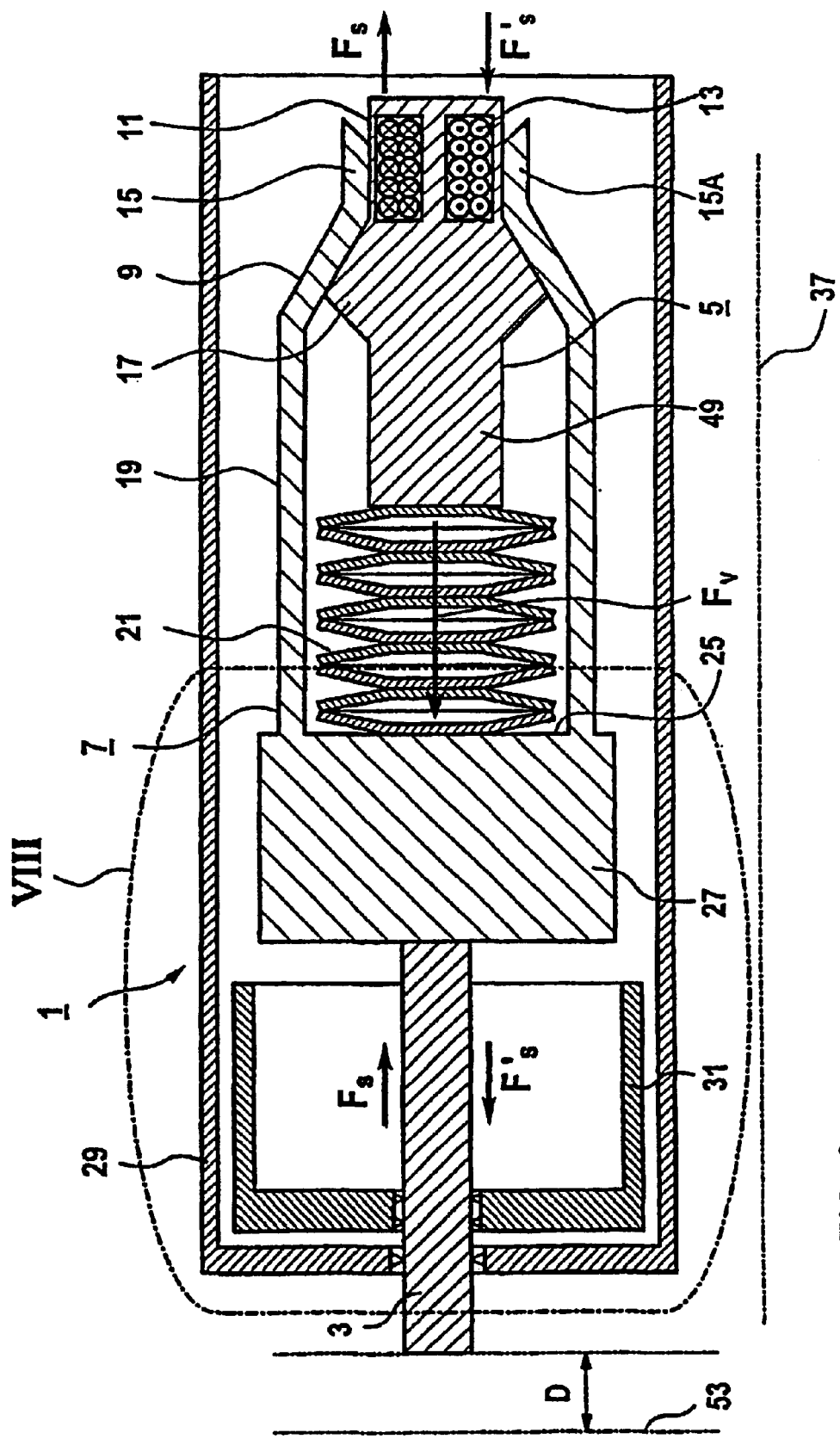

The functioning of the actuator 1 in the operating position, that is to say with the accumulator device 7 pretensioned with a pretension Fv, is explained in more detail in FIG. 3. In the operating position, the pretensioned spring element 21 is enclosed between the bottom 25 of the damper piston 27 and the ram 49 of the drive part 5. The release device 11 is activated, in that an electrical current flows through the magnetic coil 13. When a material which is magnetic at least in regions is used for the tongue 15, 15A, the tongue 15, 15A is attracted and held by the activated magnet coil 13. In this state, the stored spring energy 21 of the accumulator device 7 is enclosed, the tongues 15, 15A bracketing the latching ramp 17 in a circumferential direction. In the case of an appropriate multiplicity of tongues, 15, 15A (cf., for example, FIGS. 5 and 6), a bracket basket 19 or lamellar basket 19 formed partially by the tongues 15, 15A is thereby provided, the bracket basket 19 bracketing the drive part 5. The spring element 21 storing the pretension Fv is arranged in the bracket basket 19. The drive part 5 is coupled to the valve spindle 3 via an accumulator device 7 pretensioned to the pretension Fv in the tensioning operation, in such a way that, with the accumulator device 7 pretensioned, during the setting of an opening position D, the pretension Fv remains unchanged. As compared with the closing position 53, the actuator 1 shown in FIG. 3 is in an opening position D, the damper piston 27 being deflected completely out of the damping cylinder 31 along the longitudinal axis 37. To set or change the opening position D, an actuating force Fs, Fs' is necessary, which is provided by the drive part 5 and is transmitted to the accumulator device 7 and the valve spindle 3 connected to the latter. By an actuating force Fs along the longitudinal axis 37 in a direction facing away from the damping cylinder 31, an increase in the opening position D is achieved. By an actuating force Fs' in an opposite direction to the actuating force Fs, that is to say along the longitudinal axis 37 in a direction facing the damping cylinder 31, the opening position D is reduced. Thus, by the opening position D being set, the throughflow through a valve capable of being operated by the actuator 1 can be set exactly.

The accumulator device 7 is in this case connected to the drive part 5 in such a way that, under the pretension Fv, the drive part 5 is moved jointly with the accumulator device 7 during the setting of the opening position D. Since the valve spindle 3 is connected to the damper piston 27 of the accumulator device 7, the valve spindle 3 follows the actuator force Fs, Fs' provided by the drive part 5. During the setting of the opening position D, the actuating force Fs, Fs' to be applied for this purpose is lower than the pretension Fv. The setting of an opening position D can thus take place with a considerably lower actuating force Fs, Fs' than in conventional actuators. In particular, by the concept according to the invention, the tensioning operation for pretensioning the accumulator device 7 is separated from the actual setting of an opening position D, so that the tensioning operation and the setting operation are independent of one another. During the setting of the opening position D, the pretension Fv of the pretensioned accumulator device 7 remains unchanged, whereas, in conventional actuators with a spring accumulator, work has to be performed counter to the return force in order to set an opening position D. An opening position D may in this case also coincide with the closing position 53, so that D is then equal to 0.

For reasons of operating reliability of the actuator 1 and therefore also for a valve capable of being driven by the actuator 1, in particular for a steam turbine valve, the drive part 5 is coupled to the valve spindle 3 via the accumulator device 7 pretensioned to a pretension Fv in the tensioning operation. The accumulator device 7 includes the spring element 21, the abovementioned spring element 21 being arranged in the bracket basket 19 and acting on the damper piston 27 fastened to the valve spindle 3, the pretension $F_v$ acting, in particular, on the bottom 25 of the damper piston 27. The actuator 1 is in this case designed in such a way that the spring force of the spring element 21 can, if necessary, bring about a rapid closing of the valve capable of being driven by the actuator 1. In a closing operation of this type, the damper piston 27 together with a valve spindle 3 is accelerated by the expanding spring element 21 and is brought into the closing position 53. This quick-action closing operation, as it is known, is triggered in that the release device 11 releases the tongue 15, 15A. For this purpose, the current flow through the magnet coil 13 of the release device 11 is disconnected. As a result of the release, owing to the pretension $F_v$, the latching element 9 is released from the latching ramp 17 and, together with the entire bracket basket 19, is accelerated in the direction of the closing position 53. In the event of a current failure and of an associated undersupply of the magnet coil 13, an automatic self-closing of the actuator 1 and of the valve capable of being driven by the latter is thus ensured (cf. FIG. 4).

Figure 4:
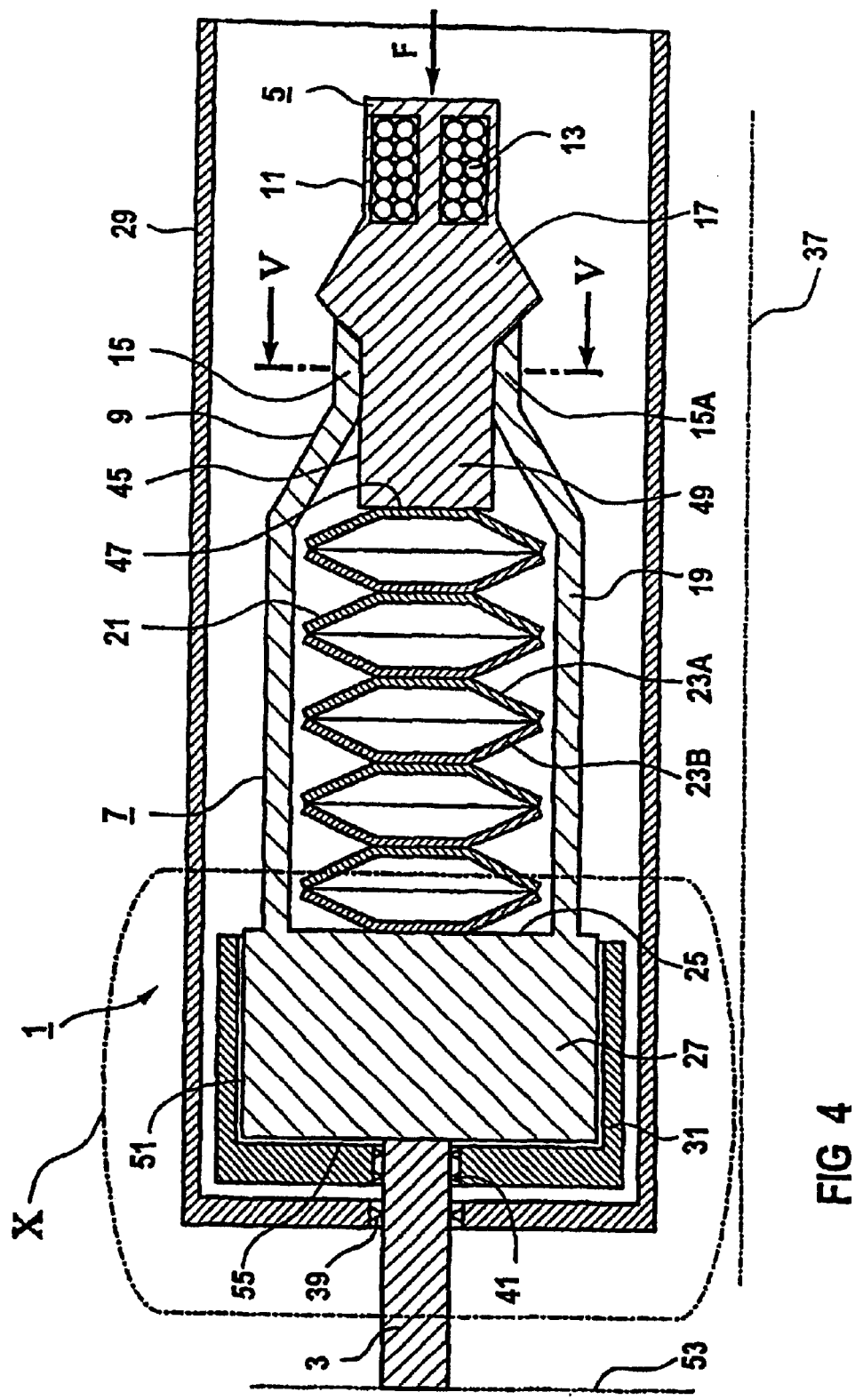

FIG. 4 illustrates an actuating state of the actuator 1 after an automatic self-closure. This actuating state essentially corresponds again to the actuator state, shown in FIG. 1, of the actuator 1 with the accumulator device 7 expanded, in particular with an expanded spring element 21. As a result of the quick-action closure, the valve spindle 3 is in the closing position 53 and a valve, not illustrated in FIG. 4, assigned to the actuator 1 is closed. To set an opening position D, the accumulator device 7 is first to be pretensioned anew with a pretension Fv, in that a force F is to be applied, parallel to the longitudinal axis 37, to the drive part 5. The more detailed particulars of a tensioning operation are already discussed exhaustively in connection with FIG. 1.

To improve the damping properties in a quick-action closure, the gap 51 formed by the damper piston 27 and the damping cylinder 31 may be acted upon at least partially by a damping fluid 55. The damping fluid 55 is in this case, for example, the hydraulic oil which serves at the same time for lubricating the movable components arranged in the housing 29 of the actuator 1. In addition, the valve spindle 3 is sealed off with respect to the damping cylinder 31 and to the housing 29 by respective sealing element 41, 39. The sealing elements 39, 41 prevent an outflow of damping fluid 55 from the gap 51 and from the housing 29. Furthermore, the sealing elements 39, 41 bring about a guidance of the valve spindle 3, so that the latter can be set uniformly and reproducibly into an opening position D or, if necessary, for example in a quick-action closure, can be brought into the closing position. To set an opening position D, further drive components, not illustrated in the FIGURES, may be connected to the drive part 5. These may be, for example, a gear and an electric motor driving the gear. In this case, the electric motor delivers the torque which actuates the drive part 5, designed, for example, as a ball-screw drive, via a, for example, multistep gear, for example an angular gear. The rotational movement of an electric motor is consequently converted into a linear movement of the drive part 5. By an electric motor being provided, together with the actuator 1, an electromechanical actuator is provided for a valve. However, in addition to the ball-screw drive mentioned by way of example, other drives, for example with a crank disk or an eccentric disk, may also come under consideration in order to set the drive part 5 in a linear movement. The concept of the invention can consequently be adapted to different gear forms in a highly flexible way. Furthermore, the actuator 1 is suitable in a highly advantageous way for different valves. It may be used for steam turbine valves, gas turbine valves or fittings in industrial plants, for example in the chemical industry, where a reliable and accurate operation of the actuator 1 is to be ensured.

Figure 5:
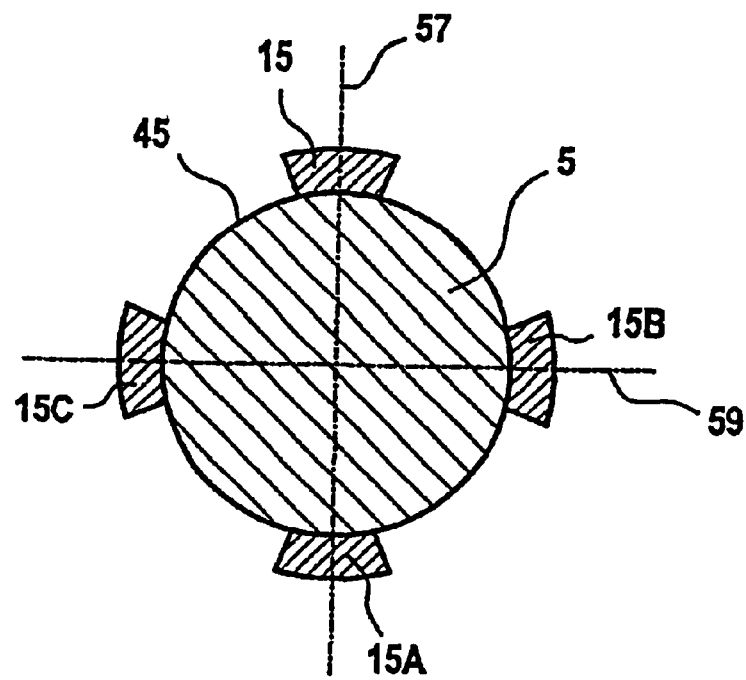
FIG. 5 shows a sectional view of the actuator illustrated in FIG. 4 along the sectional line V—V perpendicular to the longitudinal axis 37.
Figure 6:
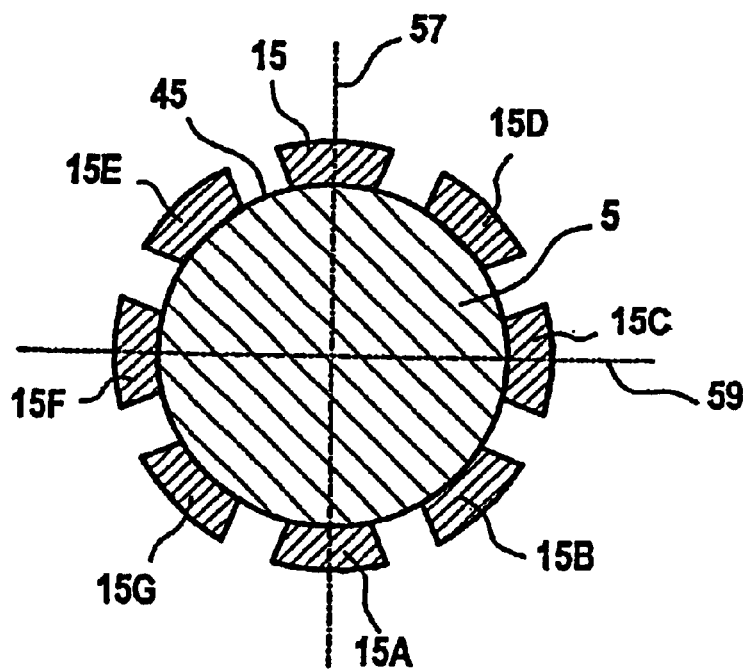
FIG. 6 shows a sectional view, similar to FIG. 5, of the actuator as shown in FIG. 4, with an alternative embodiment of the bracket basket.

In order to illustrate alternative embodiments of the bracket basket 19, FIGS. 5 and 6 show in each case a sectional view along the sectional line V—V of the actuator 1 illustrated in FIG. 4. The section is in this case to be understood as being perpendicular to the longitudinal axis 37, as a result of which a sectional plane with a first axis 57 and with a second axis 59 extending perpendicularly to the first axis 57 is defined. In FIG. 5, four tongues 15, 15A, 15B, 15C are provided, which bracket the drive part 5. The tongues 15, 15A are in this case arranged along the first axis 57, while the tongues 15C, 15B are arranged along the second axis 59. In this case, the tongue 15 lies opposite the tongue 15A and the tongue 15C lies opposite the tongue 15B along the respective axis 57, 59, the drive part 5 being bracketed. Each of the tongues 15, 15A, 15B, 15C is in this case in contact with the outer surface 45 of the drive part 5 and exerts a bracketing force or clamping force on the outer surface 45.

An alternative embodiment with a plurality of tongues 15, 15A, 15B, 15C, 15D, 15E, 15F, 15G is shown in FIG. 6. The tongues 15A, 15B, 15C, 15D, 15E, 15F, 15G are in this case arranged concentrically around the drive part 5 symmetrically in a circumferential direction. By virtue of the symmetrical arrangement, a particularly uniform force distribution and load absorption can be achieved, with the result that, in a tensioning operation, the latching element 9 having the tongues 15, 15A, 15B, 15C, 15D, 15E, 15F, 15G comes into engagement with the latching ramp 17 particularly effectively. Furthermore, in a tensioning operation, the bracket basket 19 is guided particularly uniformly in its movement in relation to the drive part 5, in particular to the ramp 49 and the latching ramp 17.

Figure 2:
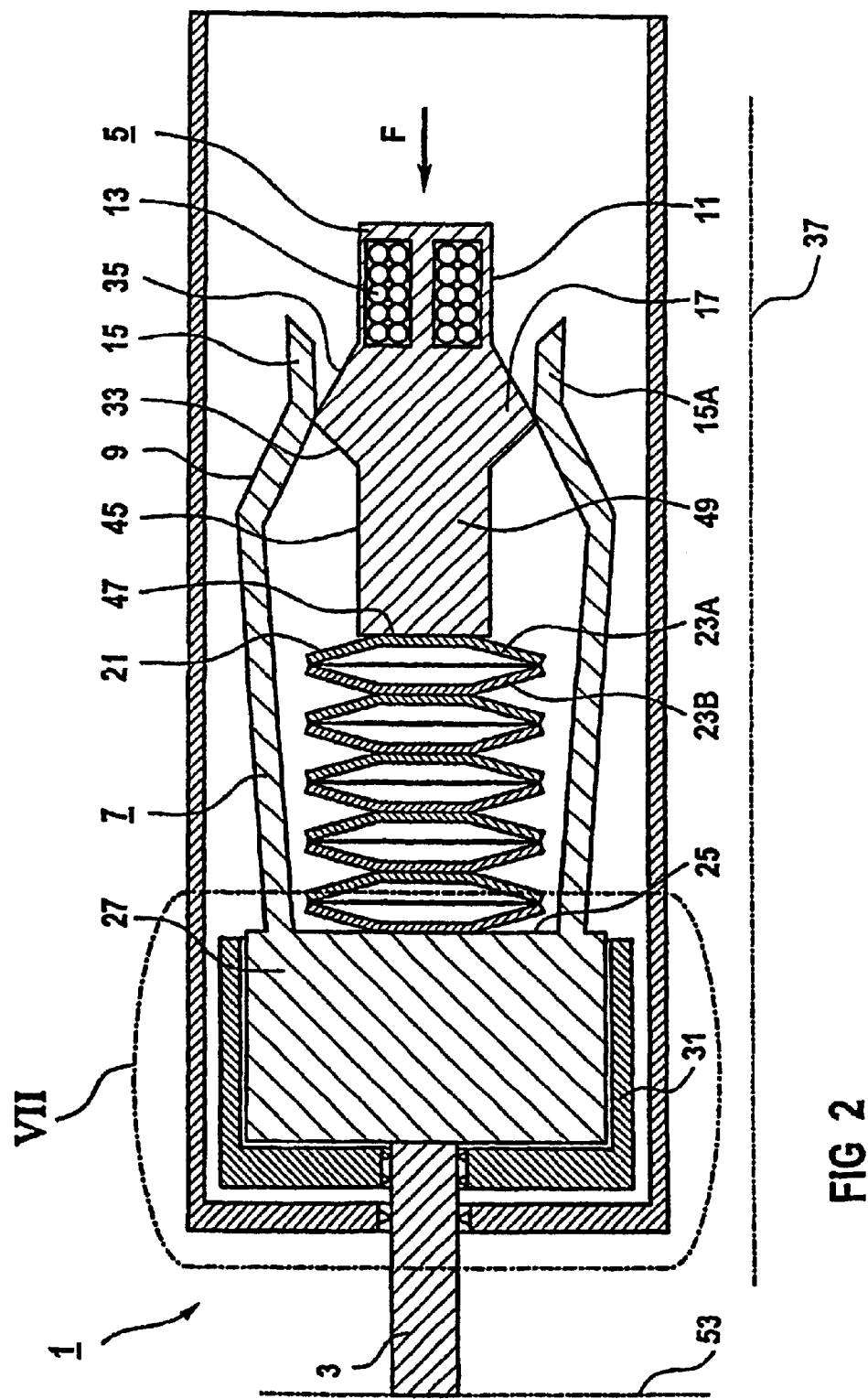
Figure 7:
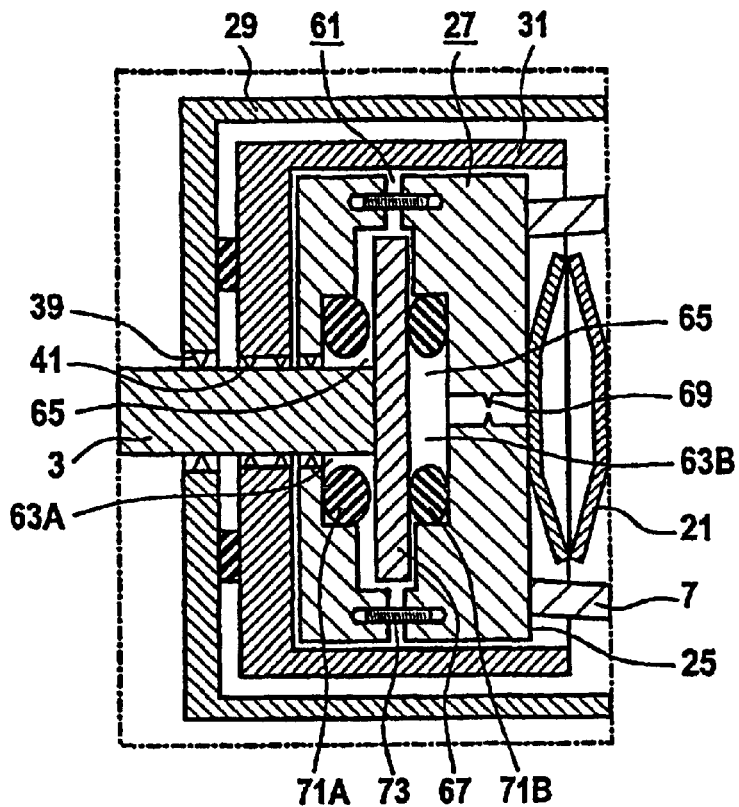
FIG. 7 shows a view of the detail VII of the actuator shown in FIG. 2, with a hydraulic damping device integrated into the damper piston.

FIG. 7 illustrates in more detail the detail VII of FIG. 2, which shows an operation for tensioning the accumulator device. In the tensioning operation, a pretension is applied to the spring element 21 of the accumulator device 7 (cf. FIG. 2). As illustrated in the view of the detail in FIG. 7, a hydraulic damping device 61 is integrated into the damper piston 27 for particularly effective end-position damping. The hydraulic damping device 61 has a first sealing space 63A and a second sealing space 63B different from the first sealing space 63A. In each case a hydraulic fluid 65, for example oil, for damping can be supplied to the first sealing space 63A and the second sealing space 63B or can be discharged from the sealing spaces 63A, 63B. For the spatial separation of the first sealing space 63A from the second sealing space 63B, a movable actuator plate 67 is provided. The latter is firmly connected to the valve spindle 3, so that a movement of the valve spindle leads directly to the movement of the actuator plate 67. A sealing element 71A is provided in the first sealing space 63A and a sealing element 71B is provided in the second sealing space 63B. The sealing elements 71A, 71B are deformable, that is to say they have some elastic properties, and may be produced, for example, as Viton O-rings. Thus, in the event of a movement of the movable actuator plate 67, a sealing element 71A, 71B can be deformed, depending on the direction of movement. The deformation of a sealing element 71A, 71B brings about a change in volume of a sealing space 63A, 63B. The supply or discharge of hydraulic fluid 65 in the first sealing space 63A and/or in the second sealing space 63B is brought about in each case via a differential pressure induced as a result of a change in volume in the sealing spaces 63A, 63B. A differential pressure is in this case established between the sealing space 63A, 63B under consideration in each case and an ambient pressure. The ambient pressure in this case prevails, for example, within the housing 29, a pressure gradient being established in the first sealing space 63A via the sealing tip 41. The second sealing space 63B is delimited by a throttle element 69, via the dimensioning of which, in particular the cross-sectional area of which, an inflow or outflow of hydraulic fluid 65 into the second sealing space 63B or out of the second sealing space 63B can be exactly defined in time. Furthermore, the damping device 61 has a setting element 73 which may be produced, for example, in the form of a setscrew. A particular deformation of the sealing elements 71A, 71B can be preset via the setting element 73, with the result that the elasticity of the sealing elements 71A, 71B and therefore the damping properties are influenced. The movable actuator plate 67 is arranged, centered approximately in the middle, within the damper piston 27 and is seated on both sides positively between the deformable sealing elements 71A, 71B.

As a result of this configuration, a deformable sealing element 71A, 71B is deformed on one side, depending on the linear direction of movement of the valve spindle. In the case of a compression of the sealing element 71B, as shown in FIG. 7, the effective sealing surface of the latter is increased and the first sealing space 73B is reduced correspondingly in its effective volume available to the hydraulic fluid. On the opposite side of the movable actuator plate 67, the sealing element 71A, for example a Viton O-ring, comes loose from the actuator plate 67 during the setting operation shown. The first sealing space 63A assigned to the sealing element 71A is increased correspondingly and is filled with hydraulic fluid 65 by virtue of the differential pressure which is established, here a vacuum in the first sealing space 63A. The deformation of the deformable or elastic sealing elements 71A, 71B is limited by a contact of the sealing elements 71A, 71B with the damper piston 27. The damper piston 27 as it were surrounds the integrated damping device 61, in particular the actuator plate 67, and also the deformable sealing elements 71A, 71B arranged on both sides of the actuator plate 67 and assigned to a respective sealing space 63A, 63B.

FIG. 7 shows in this case the setting situation where the accumulator device 7 is pretensioned to a pretension Fv and the valve in the closing position (cf. also the discussion relating to FIG. 2). In general, in application in a steam turbine valve, the latter is designed in structural terms in such a way that the prevailing steam pressure keeps the valve closed.

Figure 8:
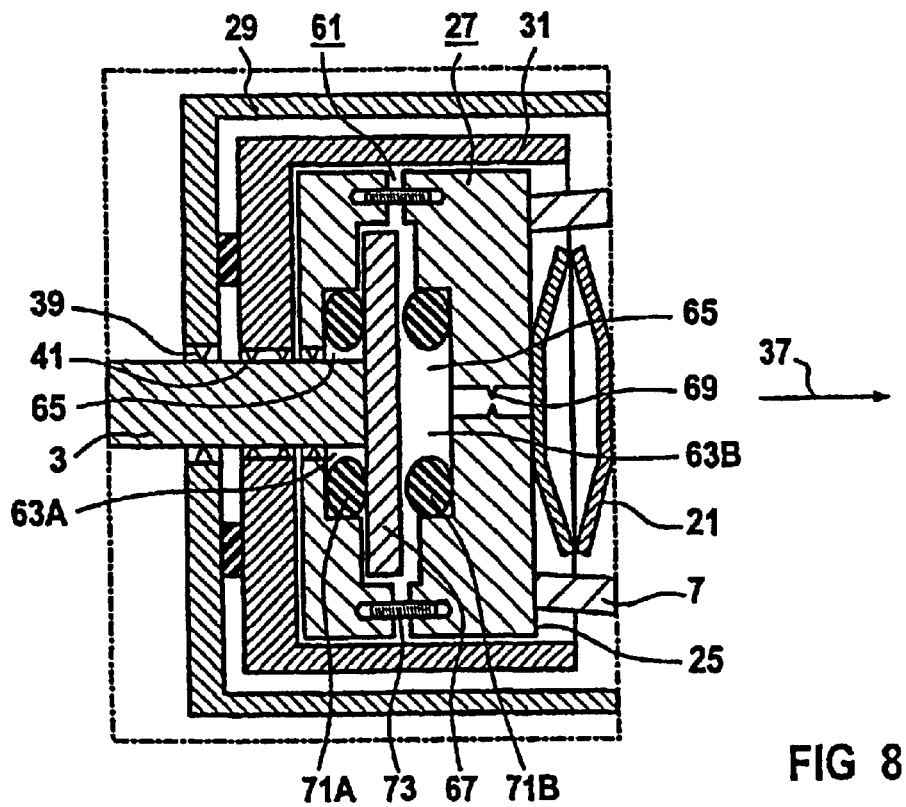
FIGS. 8 and 9 show in each case the detail VII of the actuator as shown in FIG. 3, with the accumulator device pretensioned during the setting of an opening position, with an integrated hydraulic damping device.
Figure 9:
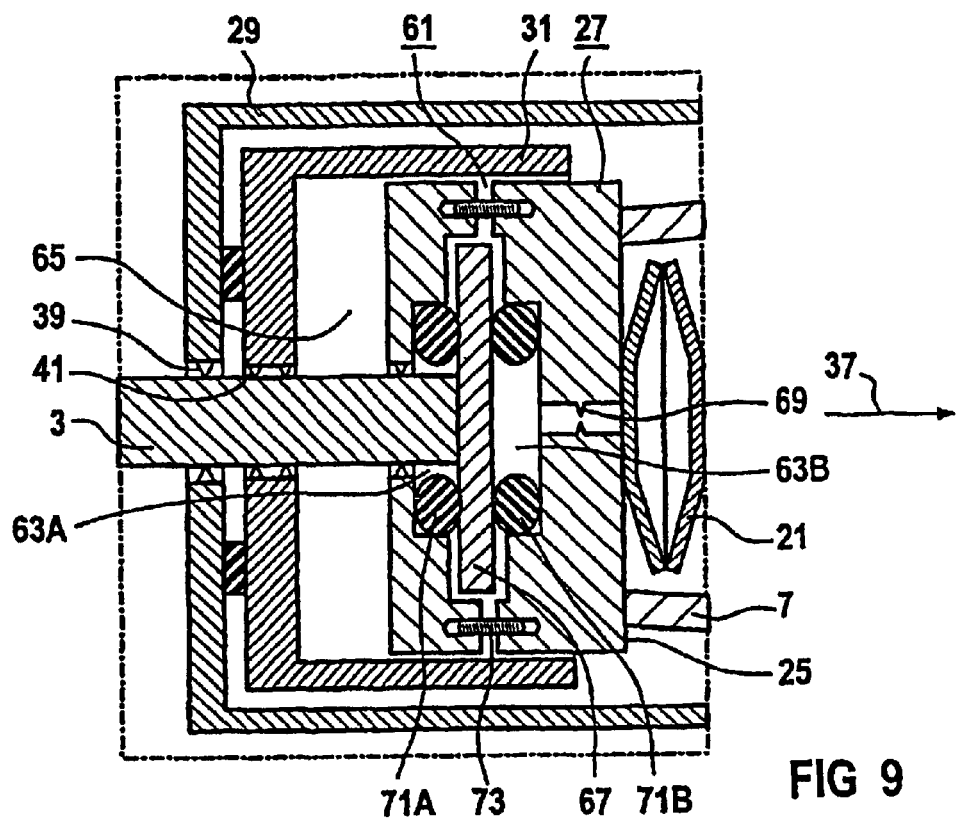

In comparison with this, FIGS. 8 and 9 show in each case situations during an opening operation of the actuator 1. With reference to FIG. 3 which shows such an actuating operation, FIG. 8 shows the start of an opening operation of the actuator 1. The actuator 1 in this case operates counter to a sealing force which keeps the valve closed. This may be, for example in application in a steam turbine, the sealing force which is provided by the steam pressure, since the steam pressure prevails at a valve cone, not illustrated in any more detail in FIG. 8, which is assigned to the valve spindle 3. As a result of this mechanical work of the actuator 1 counter to the sealing force, the damper piston 27 comes into contact with the sealing element 71A, which is located in the first sealing space 63a. The damper piston 27 in this case deforms the sealing element 71A, until the damper piston 27 and the movable actuator plate 67 come into contact, that is to say come to bear. At the same time, the sealing element 71B located in the second sealing space 63B is relieved and no longer seals off the second sealing space 63B, since the sealing element 71B comes loose from the movable actuator plate 67. This leads to an increase in the volume of the second sealing space 63B. This increase in volume in the second sealing space 63B gives rise to a vacuum, that is to say a differential pressure in relation to the surroundings, which causes the second sealing space 63B to be filled further with hydraulic fluid 65.

FIG. 9 shows, in the detail VIII, an actuating state of the actuator 1, such as arises essentially from the illustration shown in FIG. 3. FIG. 9 consequently shows, in the detail, an opening position of a valve, in which the actuator 1 has deflected the valve spindle 3, together with a damper piston 27, out of the damping cylinder 31 in the direction of the longitudinal axis 37. The integrated hydraulic damping device 61 is consequently likewise deflected correspondingly along the longitudinal axis 37 together with the damping piston 27. During the actuating operation, that is to say during the deflection, the valve spindle 3, together with the movable actuator plate 67 connected to the valve spindle 3, is essentially positively held, and at the same time guided, via the deformable, in particular elastic, sealing elements 71A, 71B. In addition, further sealing elements 39, 41, which are designed as sealing tips and via which the valve spindle 3 is sealed and guided, are provided. Consequently, during an opening operation, such as is illustrated in FIG. 9, both the sealing element 71A arranged in the first sealing space 63A and the sealing element 71B, arranged on the opposite side of the actuator plate 67, in the second sealing space 63B are in a position in contact with the actuator plate 67 and with a delimiting surface, formed by the damper piston 27, of a sealing space 63A, 63B. The two sealing elements 71A, 71B are thus pretensioned under a particular elastic tension in the respective sealing space 63A, 63B and are clamped by the actuator plate 67 and the inner delimiting surface formed by the damper piston 27. The actuator plate 67 is in this case not in contact with the damper piston 27, but is essentially already held centrally by the deformable sealing elements 71A, 71B. This configuration advantageously has the effect that vibrations which may occur and which, when the actuator 1 is used in a steam turbine, are possibly excited by a steam flow through the partially open valve and are transmitted to the actuator 1, in particular the damper piston 27 together with the integrated damping device 61, are damped by the sealing spaces 63A, 63B being filled with hydraulic fluid 65, for example hydraulic oil, and by virtual elastic sealing elements 71A, 71B.

Figure 10:
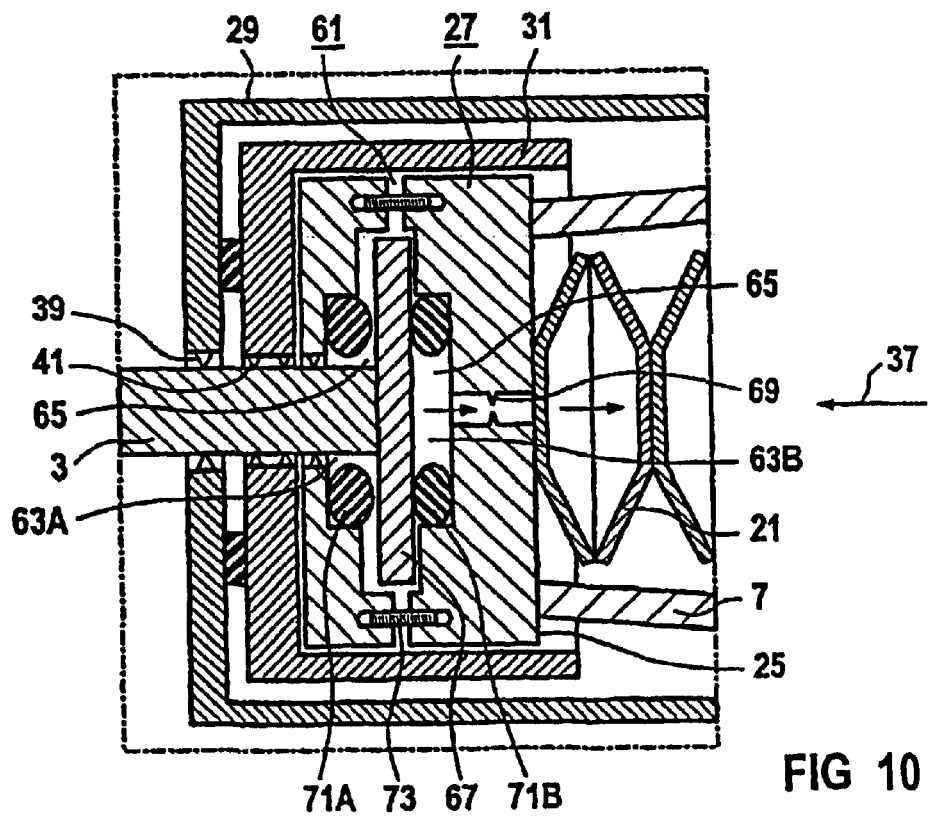
FIG. 10 shows, in a detailed view according to the detail X of FIG. 4, the integrated hydraulic damping device after the triggering of a quick-action closure.

FIG. 10 refers to the detail X of FIG. 4. In this case, an actuating state of the actuator 1 after an automatic self-closure or quick-action closure is illustrated. This actuating state also again corresponds essentially to the actuating state, shown in FIG. 1 and already discussed exhaustively, of the actuator 1, with the accumulator device 7 expanded, in particular with an expanded spring element 21. As a result of the quick-action closure, the valve spindle 3 is in the closing position 53 (cf. FIG. 4), and a valve, not illustrated in more detail in FIGS. 4 and 10, which is assigned to the actuator 1 is closed. During the quick-action closure, the damper piston 27 is accelerated in the closing direction along the longitudinal axis 37 by the released potential energy of the spring element 21.

As a result of the inertia of the masses accelerated in this case, in particular the masses of the valve spindle 3 together with the adjoining valve cone, not illustrated in any more detail, and the actuator plate 67, the sealing element 71b facing away from the closing position along the longitudinal axis 37 is deformed in the second sealing space 63B. The deformation is in this case brought about by a clamping of the sealing element 71B between the actuator plate 67 and a delimiting surface delimiting the second sealing space 63B and formed by the damper piston 27. By contrast, in the actuating state depicted in FIG. 10, the sealing element 71A in the first sealing space 63A is essentially tension-free, that is to say without corresponding deformation. The deformation of the sealing element 71B in the second sealing space 63B directly entails a reduction in the effective volume in the second sealing space 63B. This results in a displacement of hydraulic fluid 65 out of the second sealing space 63B. However, as indicated approximately via the corresponding arrows in FIG. 10, the hydraulic fluid 65 can leave the second sealing space 63B via the hydraulic throttle element 69 only. When the valve spindle 3 has finally reached the closing position 53 (cf. FIG. 4) during the quick-action closure, the mass inertia of the damper piston 27 and of the spring element 21, by virtue of their kinetic energy, initially still causes a further deformation of the sealing element 71B in the second sealing space 63B. This deformation after the valve spindle 3 has reached the closing position 53 is still continued until the damper piston 27 and the actuator plate 67 come into contact. Up to this contact, hydraulic fluid 65 will further flow out of the second sealing space 63B via the hydraulic throttle element 69. The dimensioning of the hydraulic throttle element 69, particularly in terms of the geometric cross section of the throttle element 69, in this case determines the time profile of this fluid outflow and therefore the end-position damping behavior for the damping device 61 in this operating state. The hydraulic fluid 65 flowing out of the second sealing space 63B through the hydraulic throttle element 69 is received by an essentially pressureless collecting space, not specifiable in any more detail, which is delimited, for example, by the housing 29. Consequently, in the case of a triggering of a quick-action closure, a markedly improved end-position damping for the actuator 1 is achieved by the damping device 1 integrated into the damper piston 27. As described, the damping device will make it possible, in particular, to have a controlled reduction in the impact energy when the closing position 53 is reached.

The invention has been described in detail with particular reference to preferred embodiments thereof and examples, but it will be understood that variations and modifications can be effected within the spirit and scope of the invention.

What is claimed is:

1. An actuator for a turbine valve, comprising:
   a valve spindle to set an opening position of the turbine valve;
   an accumulator device pretensionable to a pretension in a tensioning operation;
   a drive part, coupled to the valve spindle via the accumulator device, to keep the pretension unchanged during setting of the opening position after the accumulator device has been pretensioned; and
   a latching element which latches during the tensioning operation to maintain the pretension.

2. The actuator as claimed in claim 1, wherein an actuating force applied for setting of the opening position is lower than the pretension.

3. The actuator as claimed in claim 1, wherein the drive part is moved jointly with the accumulator device during the setting of the opening position.

4. The actuator as claimed in claim 1, wherein the latching element holds at least approximately 50% of the pretension when latched.

5. The actuator as claimed in claim 4, further comprising a release device to hold up to approximately 50% of the pretension.

6. The actuator as claimed in claim 5, further comprising a coil to activate said release device electromagnetically.

7. The actuator as claimed in claim 6,
   wherein the drive part includes a latching ramp, and
   wherein the latching element has a resiliently elastic pliable tongue for positive engagement with the latching ramp.

8. The actuator as claimed in claim 7, further comprising a plurality of tongues bracketing the latching ramp in a circumferential direction.

9. The actuator as claimed in claim 8, further comprising a bracket basket formed partially by the tongues, the bracket basket bracketing the drive part.

10. The actuator as claimed in claim 9, further comprising a cup spring, arranged in the bracket basket, to store the pretension.

11. The actuator as claimed in claim 10, further comprising a damper piston at a bottom of the bracket basket to damp movement of the valve spindle during an expansion of the cup spring.

12. The actuator as claimed in claim 11, further comprising a hydraulic damping device for end-position damping, integrated into the damper piston.

13. The actuator as claimed in claim 12, wherein the hydraulic damping device includes a first sealing space and a second sealing space different from the first sealing space; and hydraulic oil for damping that is one of supplied to and discharged from the first and second sealing spaces as a function of the opening position.

14. The actuator as claimed in claim 13, wherein one of supply and discharge of hydraulic fluid in the first and second sealing space is brought about via a differential pressure induced as a result of a change in volume of the sealing spaces.

15. The actuator as claimed in claim 14, wherein the hydraulic damping device further includes a movable actuator plate for spatial separation of the first and second sealing spaces.

16. The actuator as claimed in claim 15, wherein the hydraulic damping device includes a hydraulic throttle element adjacent to at least one of the first and second sealing spaces.

17. The actuator as claimed in claim 16, wherein arranged in at least one of the first and second sealing spaces is a deformable sealing element to change a volume of the at least one of the first and second sealing spaces via deformation of the deformable sealing element.

18. The actuator as claimed in claim 17, further comprising a setscrew interacting with the deformable sealing element to set elasticity of the deformable sealing element.

19. The actuator as claimed in claim 18, wherein the turbine valve is connected to a steam turbine.

* * * * *